March 21, 1933.　　　E. F. HUDDLE　　　1,901,968
PITMAN FOR AGRICULTURAL IMPLEMENTS
Filed Oct. 9, 1931
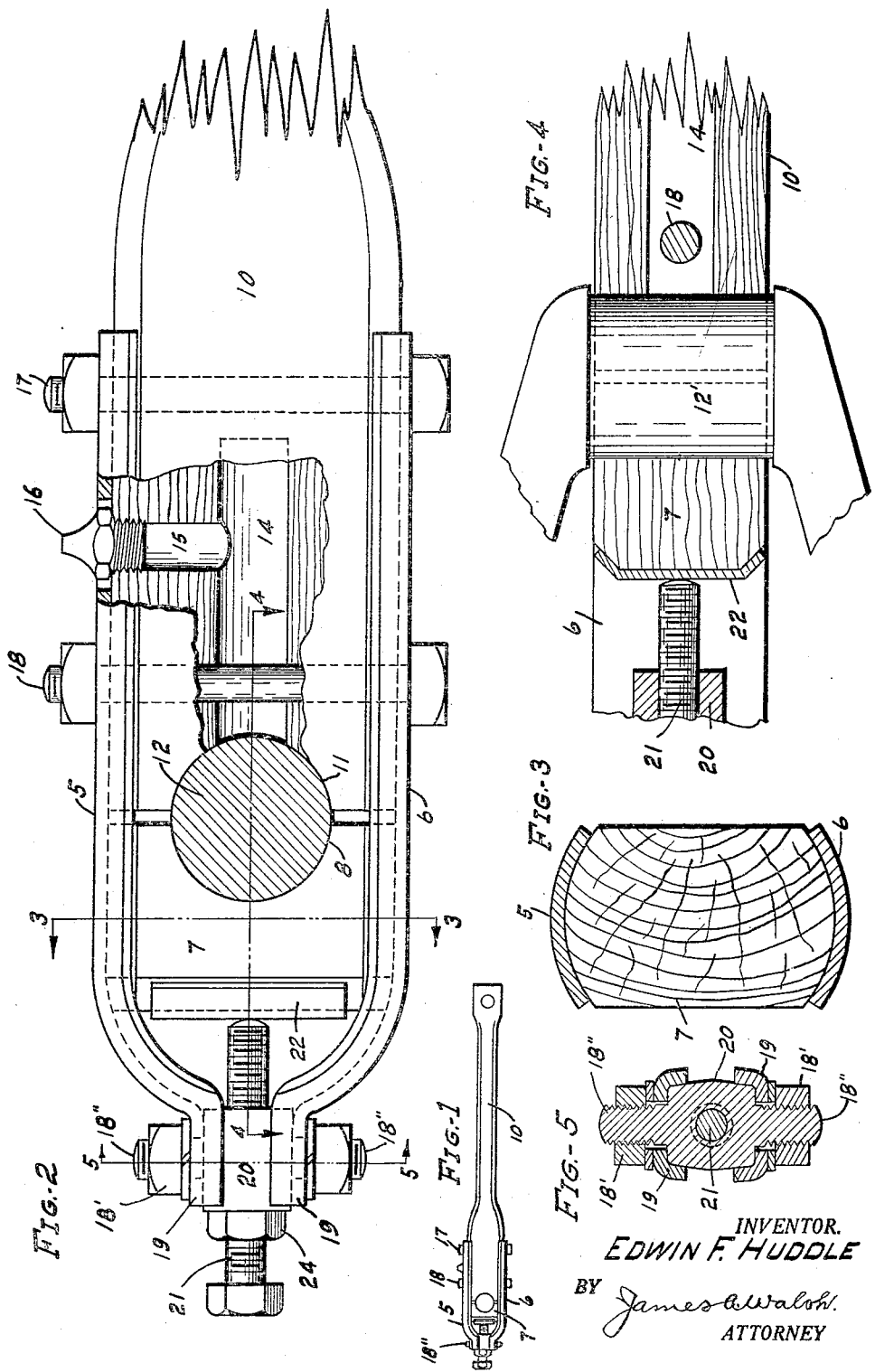
INVENTOR.
EDWIN F. HUDDLE
BY James A. Walsh
ATTORNEY Patented Mar. 21, 1933

1,901,968

UNITED STATES PATENT OFFICE

EDWIN F. HUDDLE, OF ROCKFORD, ILLINOIS, ASSIGNOR TO J. I. CASE COMPANY, OF RACINE, WISCONSIN, A CORPORATION

PITMAN FOR AGRICULTURAL IMPLEMENTS

Application filed October 9, 1931. Serial No. 567,850.

My invention relates to improvements in the construction of a pitman of the type commonly employed in connection with agricultural machinery, comprising built-up wooden and metal parts, which are subjected to severe duty resulting in the splitting and shattering of the wooden bearings, and such devices also are subjected to deterioration from exposure to weather conditions, which cause the bearings to become dry and shrunken and eventually so disintegrated as to separate and fall from their metal bindings. It is the object of my invention, therefore, to so improve a pitman of this type as to obviate the objections referred to and to provide a device of the character which may be readily assembled and disassembled, looseness of the parts taken up, the shaft bearing lubricated, and to otherwise improve the structure.

In the accompanying drawing, forming part hereof, Figure 1 is a diagrammatic view of a pitman embodying my improvements; Fig. 2, an enlarged fragmentary side elevation of the pitman the outer portion thereof being broken away; Fig. 3, a detail section taken on the dotted line 3—3 in Fig. 2; Fig. 4, a detail section on the dotted line 4—4 of Fig. 2, and Fig. 5 is a detail section on the dotted line 5—5 in Fig. 2.

In said drawing the numerals 5 and 6 indicate metal binding straps which I employ and which are curved in cross-section substantially in the manner indicated in Fig. 3 to follow the contour of and overlap the upper and lower curved sides respectively of a wooden bearing-block 7 having a semi-circular shaft-bearing 8 therein, Fig. 2. The pitman arm 10 is inserted between the straps and embodies a semi-circular bearing surface 11 in its end which aligns with the end of the block 7 to form a circular bearing for a shaft 12, as indicated in Fig. 2, which may be inserted and withdrawn at will. The arm 10 is provided with a reservoir 14 and an inlet 15 through which oil may be supplied for lubricating shaft 12 by means of the fitting 16 threaded in the inlet 15, and said arm and straps are secured together by bolts 17, 18, in fixed position, the rear end of said straps being curved or converging and terminating in horizontal binders 19 between which an internally threaded socket member 20 having threaded shanks 18'' formed integrally therewith is secured by the nuts 18', in which socket a set-screw 21 is inserted the inner end of which engages a metal end-plate or cap 22 on the end of bearing block 7, by which arrangement when the screw is advanced the block will be forced toward the arm 10 to take up any looseness or wear of the bearing surfaces between these parts, and the screw then retained by a lock-nut 24, as will be understood.

In Fig. 2 a straight shaft 12 is indicated as mounted in the pitman, which, as stated, may be readily inserted and withdrawn. However, when it becomes necessary to operate with a crank-shaft, as Fig. 12', Fig. 4, the pitman can be readily secured on its crank by removing the nuts from bolts 17, 18 and threaded shank 18'', and then either of the straps 5 or 6, when the set-screw 21 is backed so that the block 7 may be shifted away from the arm 10 and the latter moved in the opposite direction, which will separate the meeting ends of said parts sufficiently to bring the semi-circular bearing surfaces thereof about the crank, when said parts 7 and 10 can be brought substantially together, the strap and nuts replaced and the bolts tightened, the end-plate or cap 22 properly positioned and the set-screw 21 tightened against the latter. The space between the ends of the parts 7 and 10 is shown as somewhat enlarged for purposes of clearness, but it will be understood that normally these ends are slightly spaced by shimming.

By forming the upper and lower sides of the block 7 and arm 10 in curved formation and the straps 5 and 6 likewise to snugly fit said parts it will be apparent that when the straps are securely bolted thereto the parts being so tightly bound as to be fixedly held in place regardless of the splitting or shattering of the wooden elements which commonly occurs, and in which manner I produce a strong and durable pitman for the purposes stated.

I claim as my invention:

A pitman comprising an arm, a bearing-block adjacent thereto, straps overlapping the outer sides of the arm and block and terminating in converging ends adjacent the block, means for securing the arm and straps together, an internally threaded socket member between said converging ends having shanks thereon passing through the ends, means on the shanks for securing the socket member and converging strap ends together, and a screw follower in the socket for adjusting the bearing-block.

In testimony whereof I affix my signature.

EDWIN F. HUDDLE.